(12) United States Patent
Cartron et al.

(10) Patent No.: US 9,135,110 B2
(45) Date of Patent: Sep. 15, 2015

(54) METHOD AND DEVICE FOR ENHANCING THE RELIABILITY OF A MULTIPROCESSOR SYSTEM BY HYBRID CHECKPOINTING

(75) Inventors: Mickaël Cartron, Chatillon (FR); Yoann Congal, Plaisir (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 128 days.

(21) Appl. No.: 13/991,128

(22) PCT Filed: Nov. 24, 2011

(86) PCT No.: PCT/EP2011/070978
§ 371 (c)(1),
(2), (4) Date: Jun. 12, 2013

(87) PCT Pub. No.: WO2012/072500
PCT Pub. Date: Jun. 7, 2012

(65) Prior Publication Data
US 2013/0254591 A1 Sep. 26, 2013

(30) Foreign Application Priority Data
Dec. 1, 2010 (FR) ...................................... 10 59989

(51) Int. Cl.
*G06F 11/00* (2006.01)
*G06F 11/10* (2006.01)
*G06F 11/14* (2006.01)

(52) U.S. Cl.
CPC .......... *G06F 11/1008* (2013.01); *G06F 11/141* (2013.01); *G06F 11/1402* (2013.01); *G06F 11/1438* (2013.01)

(58) Field of Classification Search
CPC ............ G06F 11/1008; G06F 11/1438; G06F 11/141; G06F 11/073; G06F 11/1402; G06F 11/1446; G06F 11/1448; G06F 11/1458; G06F 11/1469; G06F 11/3017; G06F 11/3037
USPC ................................ 714/20, 6.11, 6.1, 10, 15
See application file for complete search history.

(56) References Cited

U.S. PATENT DOCUMENTS

| | | | |
|---|---|---|---|
| 5,923,832 A | 7/1999 | Shirakihara et al. | |
| 6,044,475 A * | 3/2000 | Chung et al. | 714/15 |
| 6,393,583 B1 * | 5/2002 | Meth et al. | 714/12 |
| 6,658,589 B1 | 12/2003 | Taylor | |
| 2006/0101033 A1 | 5/2006 | Hu et al. | |
| 2009/0182782 A1 | 7/2009 | Karve et al. | |
| 2010/0251031 A1 * | 9/2010 | Nieh et al. | 714/45 |

OTHER PUBLICATIONS

K. Mani Chandy, et al., "Distributed Snapshots: Determining Global States of Distributed Systems", ACM Transactions on Computer Systems, Feb. 1985, pp. 63-75, vol. 3, No. 1.

* cited by examiner

*Primary Examiner* — Joseph D Manoskey
(74) *Attorney, Agent, or Firm* — Baker & Hostetler LLP

(57) ABSTRACT

The present invention relates to a method and a device for enhancing the reliability of a system comprising a plurality of processors and a memory. The method comprises a step of grouping processes into a plurality of groups and a step of saving, individually for each group of processes, data stored in the memory which can be used by at least one of the processes belonging to said group, so as to restore an error-free global state of the system following an error occurring in a processor executing one of the processes belonging to said group without having to restore the entire memory.

7 Claims, 9 Drawing Sheets

METHOD AND DEVICE FOR ENHANCING THE RELIABILITY OF A MULTIPROCESSOR SYSTEM BY HYBRID CHECKPOINTING

CROSS-REFERENCE TO RELATED APPLICATIONS

This application is a National Stage of International patent application PCT/EP2011/070978, filed on Nov. 24, 2011, which claims priority to foreign French patent application No. FR 1059989, filed on Dec. 1, 2010, the disclosures of which are incorporated by reference in their entirety.

FIELD OF THE INVENTION

The present invention relates to a method and a device for enhancing the reliability of a multiprocessor system by hybrid checkpointing. It is applicable notably in the field of embedded multiprocessor systems.

BACKGROUND

The general problem is the reliability of multiprocessor systems, in the logic of which transient faults can occur and lead to failures. For example, there may be a fault in the logic of one of the processors. Such transient faults may be due to temporary disruptions such as falling neutron or proton particles, to radiation such as gamma radiation or to inductive noise on the power supply. Indeed, current multiprocessor technologies are increasingly sensitive to such disruptions, due to the ever higher level of integration in terms of surface density of transistors and total number of transistors. In order to facilitate critical applications with a high level of reliability, it is desirable to guard against these transient faults, which may be propagated in memory.

In an attempt to solve the problems associated with transient faults, techniques based on memory Error Correcting Codes, or ECC in English, have been developed. These techniques are flexible, since the correction power of the code can be adapted to the targeted environmental conditions and the expected level of reliability. In addition, they are easy to implement since the coder/decoder is shared for all memory locations, which enables a low surface overhead to be generated for control. A major drawback of these techniques is that they can only be used due to the regularity of typical memory structure. Unfortunately the errors occurring in processor logic (as opposed to memory) do not offer such regularity.

Other approaches have been explored in an attempt to enhance the reliability of the logic of multiprocessor systems, notably approaches based on spatial duplication, approaches based on multisampling or 'pointing-oriented' approaches, better known in English as checkpointing.

Approaches based on spatial duplication exist in several variants, but the common idea is to perform the desired calculation simultaneously on several identical logic circuits and to react in the event of observing a difference in the outputs. One variant consists in having two instances of the circuit to be protected, associated with a detection mechanism on at least one of the instances for determining which of the two instances has suffered the error. This spatial duplication variant, however, has several drawbacks. First of all, the logic has to be duplicated and as soon as a transient error has occurred, the two instances have then diverged, which requires adding a system for resynchronizing the two instances. In addition, the error detection is on the critical path of the data stream, which is detrimental to performance and requires a very fast detector to be chosen, at the expense of its complexity and its error coverage.

Another variant is to have three instances in parallel and a majority vote at the output. This method avoids placing a detector in one of the instances like the two-instance method previously described, but it displays a majority vote system on the critical path of the data stream, which again is detrimental to performance. In addition, the tripling of the logic is very expensive in surface.

Approaches based on multisampling consist in replacing all the flip-flops of a circuit with special flip-flops for sampling the signal several times. Statistically, in the event of temporary disruption and if the system is properly dimensioned, i.e. if its operating frequency is not too high, the conditions can be met for there to be little chance that an error would affect all the samples. There are basically two variants of multisampling: pre-sampling and post-sampling. In all cases, these methods are expensive in surface and fault tolerance is partial and difficult to achieve.

Indeed, a major drawback of pre-sampling is that it limits the operating frequency of the system and hence its performance. But in the event of divergence, the second sample is statistically more likely to be correct, since many transient faults result in an increased latency. Pre-sampling is therefore a method of fault detection and probable fault tolerance.

While in the case of post-sampling, the fault can only be detected, not tolerated. This is one of its major drawbacks.

Finally, checkpointing-oriented approaches, according to the English expression, consist notably in periodically placing the data of the security monitored system in a storage memory, with the object of reusing them later if needed for recovering the system state. In the rest of the present application, the term "checkpointing approach" or "checkpointing system" will be used for designating a checkpointing-oriented approach or a system implementing such an approach. In the rest of the present application, all the data stored in a storage step implemented as part of a checkpointing approach will be referred to simply as a "checkpoint". Checkpointing approaches can be used to put the monitored system back to a state prior to the occurrence of the fault and all its consequences. In order to create a system tolerant to transient faults in logic, it is further necessary to combine the checkpointing system with fault or error detectors. This checkpointing approach then assumes that the monitored system has not suffered any faults and detection is performed in parallel with the function of the monitored block. Detection is then referred to as "outside the critical path," which maximizes performance while it remains possible to cancel actions. If the assumption that the monitored system has operated properly proves correct, then it simply continues its execution. Otherwise, the monitored system stops its operation and its fault-free state with all its consequences is then restored.

Checkpointing approach variants are distinguished firstly by the extent of their recovery capacity. For example, some checkpointing systems are limited by the extent of a processor, the English term "rollback" then being used. In this case, it is possible to undo incorrect actions in the processor, but all actions outside the processor, such as reading and writing to the memory space, cannot be canceled. This checkpointing approach must therefore be combined with fault or error detectors with very low latency, optionally at the expense of detection coverage. Other checkpointing systems extend over more extensive systems than the single processor. This then allows high detection latency and it can be used to maintain high performance due to the fact that the detection is performed outside the critical path.

Checkpointing approach variants are also distinguished by the control policy. In the case of a multiprocessor system with several memory modules, each processor and each memory module manages its own control independently whether for verification or storage. The global checkpointing policy may then vary from one system to another: it may be coordinated or uncoordinated.

Coordinated approaches offer to create global and coordinated checkpoints for the whole system. Checkpoints are thus consistent by construction and therefore rapidly obsolete, which tends to reduce the number of checkpoints stored simultaneously and thus to reduce the volume of storage. However, when a component or application requires a checkpoint, it takes the whole system into this decision. While this behavior is acceptable in simple contexts, e.g. when there are few processors and a few unconnected applications, it becomes unacceptable when the system increases in complexity, e.g. in cases of multiprocessors and/or multiapplications. Thus, this coordinated approach easily leads to a situation where the "global worst case" has to be managed, i.e. where the cost (in memory and performance) of synchronization becomes predominant since checkpoints become very frequent and where concurrently the checkpoints to be stored are very bulky since they are global.

Conversely, an uncoordinated checkpoint policy is possible. In this approach, checkpoints are created at the most appropriate times in an uncoordinated way on the various components of the monitored system. If recovery proves necessary, then a set of checkpoints must be determined, more specifically one checkpoint per component, which has the property of consistency as described by K. Mani Chandy and Leslie Lamport in "Distributed Snapshots: Determining Global States of Distributed Systems" (ACM Transactions on Computer Systems, Vol. 3, No. 1, February 1985, Pages 63-75). In an extreme case, if it is not possible to find a consistent set of checkpoints, then the chosen rollback state is the initial state of the system through the "domino effect". The advantages of this uncoordinated approach are that the checkpoints are chosen in a targeted way per component, which generates less overhead in synchronization and local checkpointing. In addition, the storage of checkpoints is globally less bulky. Finally, there is no "global worst case" effect typical of the coordinated approach. On the other hand, checkpoints are not consistent by construction, which makes the obsolescence of checkpoints slow or zero, in any case difficult to determine. This means that the volume of storage is a priori unbounded, which is problematic, especially in embedded situations. The eligibility of this approach is thus closely linked to the application context, which is still a major drawback.

SUMMARY OF THE INVENTION

Being based on a hybrid checkpointing method, the checkpointing being coordinated within process groups and not coordinated between these groups, the purpose of the invention is notably to avoid both the aforementioned drawbacks of coordinated checkpointing methods and the aforementioned drawbacks of uncoordinated checkpointing methods. To this end, the subject matter of the invention is a method for enhancing the reliability of a system comprising a plurality of processors and a memory. The method comprises a step of grouping processes into a plurality of groups. It also comprises a step of saving, individually for each group of processes, data stored in the memory which can be used by at least one of the processes belonging to said group, so as to restore an error-free global state of the system following an error occurring in a processor executing one of the processes belonging to said group, without having to restore the entire memory.

Advantageously, each group may group processes sharing a system resource. For example, the shared resource may be the memory.

In a preferred embodiment, each group may be a data dependency sphere able to group processes that can access memory areas such that the union of all said areas is logically connected, and such that any area among said areas has a non-empty intersection with the union of all the other areas among said areas.

Advantageously, the method may comprise a step of confinement of accesses to the memory by data dependency sphere. This step of confinement may include a step of managing access rights to the memory areas for each process, so as to prevent the propagation of a logic error occurring in the processor executing said process, and a step of managing indicators of memory areas belonging to each data dependency sphere.

The subject matter of the invention is also a device for enhancing the reliability of a system comprising a plurality of processors and a memory. The device comprises means for grouping processes into a plurality of groups. It also comprises means for saving, individually for each group of processes, the data stored in the memory which can be used by at least one of the processes belonging to said group, so as to restore an error-free global state of the system following an error occurring in one of the processors executing one of the processes belonging to said group, without having to restore the entire memory.

Advantageously, the means for grouping may group processes sharing a system resource. For example, the shared resource may be the memory.

In a preferred embodiment, the means for grouping may group processes by data dependency spheres, each data dependency sphere being able to contain processes that can access memory areas such that the union of all said areas is logically connected and such that any area among said areas has a non-empty intersection with the union of all the other areas among said areas.

Advantageously, the device may comprise means for confining accesses to the memory by data dependency sphere, these means for confining being able to include means for managing access rights to the memory areas for each process, so as to prevent the propagation of a logic error occurring in the processor executing said process, and means for managing indicators of memory areas belonging to each data dependency sphere.

In one embodiment, for each data dependency sphere, the saved data may include the data stored in the connected union of the memory areas that can be accessed by one of the processes belonging to said sphere. They may also include the data stored in the registers of the processors executing one of the processes belonging to said sphere. They may also include the data stored in the pipeline stages of the processors executing one of the processes belonging to said sphere. They may also include the data stored in the memory management units or in the memory protection units included in the processors executing one of the processes belonging to said sphere. Finally, they may include the data stored in the cache memories of the processors executing one of the processes belonging to said sphere.

In one embodiment, the means for grouping the processes into data dependency spheres may be implemented in the form of services supplied by the operating system of the system, these services being able to supply the various data dependency spheres corresponding to all the currently executed processes.

In one embodiment, the means for saving may include means for coordinating the saves of the various data dependency spheres corresponding to all the currently executed processes, these means for coordinating being able to include means for initiating a data save for a data dependency sphere corresponding to currently executed processes, and means for initiating, following the logic error that has occurred in one of the processors executing one of the processes belonging to said sphere, the restoration of the data saved for said dependency data sphere exclusively.

In one embodiment, the means for confining may include a memory management unit or a memory protection unit associated with each of the processors of the system, said unit being able to deny to the processor with which it is associated access to the memory outside the area allocated to the process being executed by said processor.

In one embodiment, the memory management unit or memory protection unit may include means for managing memory access rights, the current data dependency spheres being dependent on these access rights.

The present invention has the main advantage of combining the advantages of coordinated policies, such as the rapid obsolescence and bounded storage of checkpoints, with the advantages of uncoordinated policies, such as the low synchronization overhead, low checkpointing overhead and overall optimum size of checkpoint storage.

BRIEF DESCRIPTION OF THE DRAWINGS

Other features and advantages of the invention will become apparent from the following description made with reference to the accompanying drawings depicting.

DETAILED DESCRIPTION

In a basic embodiment of the invention, processes may be grouped in a totally arbitrary manner, i.e. although these processes strictly have no connection between them. Such an arbitrary grouping of processes leads to an operation which, although avoiding the drawbacks of the coordinated checkpointing methods and uncoordinated checkpointing methods of prior art, is, however, not optimal. That is why, in the rest of the present application, a better performing embodiment is described, in which processes sharing memory areas are grouped based on the Data Dependency Sphere concept (SDD) according to invention.

But it will not escape the person skilled in the art, upon reading the present application, that the scope of the present invention extends beyond the sharing of memory areas. Processes sharing a communication resource, or processes sharing an input/output resource, or processes sharing a hardware interrupt can be grouped according to the invention.

Data Dependency Sphere

Figure 1:
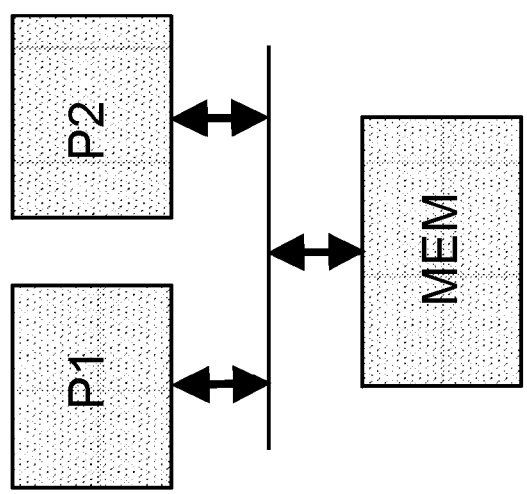
FIG. 1, a schematic illustration of the principle of the data dependency sphere according to the invention.
Figure 1:
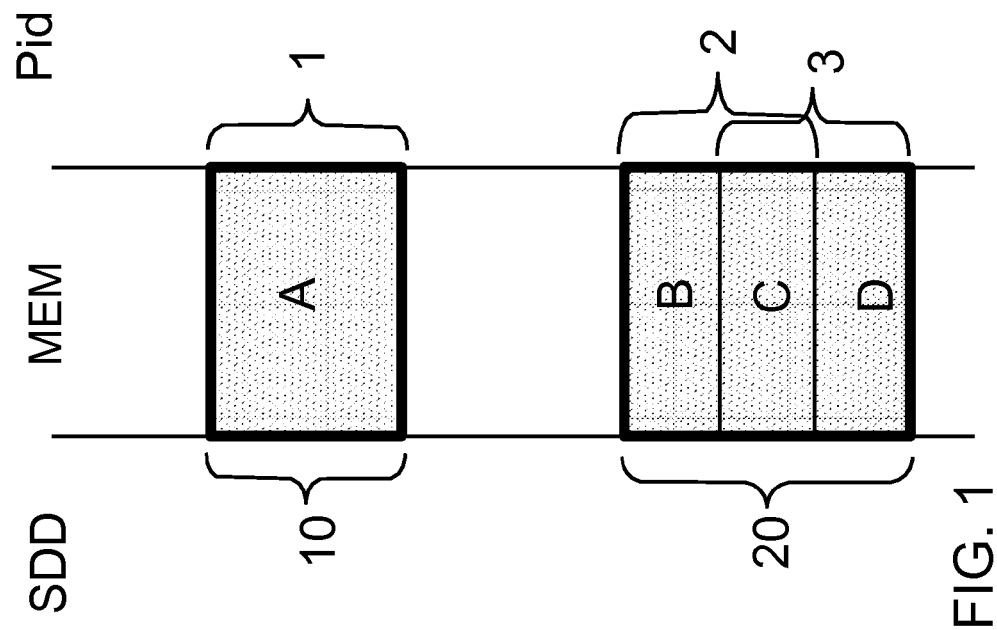

FIG. 1 schematically illustrates the SDD principle according to the invention. An SDD is a group of processes that use common memory areas. Thus, in the example of FIG. 1, a multiprocessor system comprises two processors P1 and P2 sharing a main memory MEM. The components supplying the system's resources, namely the processors P1, P2 and the memory MEM, are connected by a data bus. A process for which the Pid ("Process identifier") is 1 uses data in a memory area A of the memory MEM, which data is able to include the code and the data. A process for which the Pid is 2 uses data in areas B and C of the memory MEM. A process for which the Pid is 3 uses data in area C and in area D of the memory MEM. Two unconnected SDDs 10 and 20 may then be created according to the invention. SDD 10 includes the process Pid=1 and has memory area A for memory sector. SDD 20 includes the process Pid=2 with the process Pid=3 and has memory areas B, C and D for memory sector. Considering the memory sector of SDD 20, it can be seen that the union of the area BuC able to be accessed by process 2 with the area CuD able to be accessed by process 3 is logically connected according to the present invention, since the union of the representation of the area BuC in FIG. 1 with the representation of the area CuD in FIG. 1 is all of one piece in FIG. 1. According to the present invention, it is a matter of logical connectivity and not physical connectivity. The union of such areas may not be physically connected, but since these areas are represented in a geometrical space, the union of their representations has the property of connectivity in the representation space, as shown in FIG. 1. It can also be seen that the intersection between the area BuC and the union of the other areas forming the memory sector of SDD 20, namely only the area CuD is not empty (since it is equal to C). It may be noted that a process cannot belong to more than one SDD and that an SDD may optionally consist of a single process.

In one embodiment, SDD management, which includes the creation, modification and deletion of an SDD according to the creations and deletions of processes on processors P1 and P2, can be left to the programmer. The programmer should then have excellent control of the resources used by the latter's program, whether it involves computing resources such as P1 and P2 or whether it involves memory storage resources such as MEM.

Advantageously, a confinement sector for each of the SDDs 10 and 20 can be created by using, associated with each of the processors P1 and P2, a component such as a Memory Management Unit (MMU) or such as a Memory Protection Unit (MPU). Once correctly configured, these MMUs or MPUs may deny accesses beyond the memory sector of the SDD of the processor with which they are respectively associated. Usually, MMUs and MPUs are used for countering possible programming errors. The present invention provides for using them advantageously for countering the effects of transient faults in logic.

In a preferred embodiment, SDD management may be implemented by system services, e.g. by system services already used by the MMUs and MPUs, so as not to complicate the task of the programmer. These system services are called up, for example, in the following cases: when placing tasks on the resources, when allocating memory, when requesting access to a resource, when requesting access to an IPC (Inter Process Communication) type communication resource.

Once the confinement sectors are set up according to the invention, properties appear which optimize checkpointing, so that it is much more effective than the coordinated and uncoordinated techniques of prior art. The present invention provides a policy of hybrid checkpointing, coordinated checkpointing within SDDs and uncoordinated checkpointing between SDDs. This policy enables considerably improved checkpointing systems to be implemented both regarding processing and storage, especially in a multiapplication and multiprocessor context.

General Architecture

Figure 2:
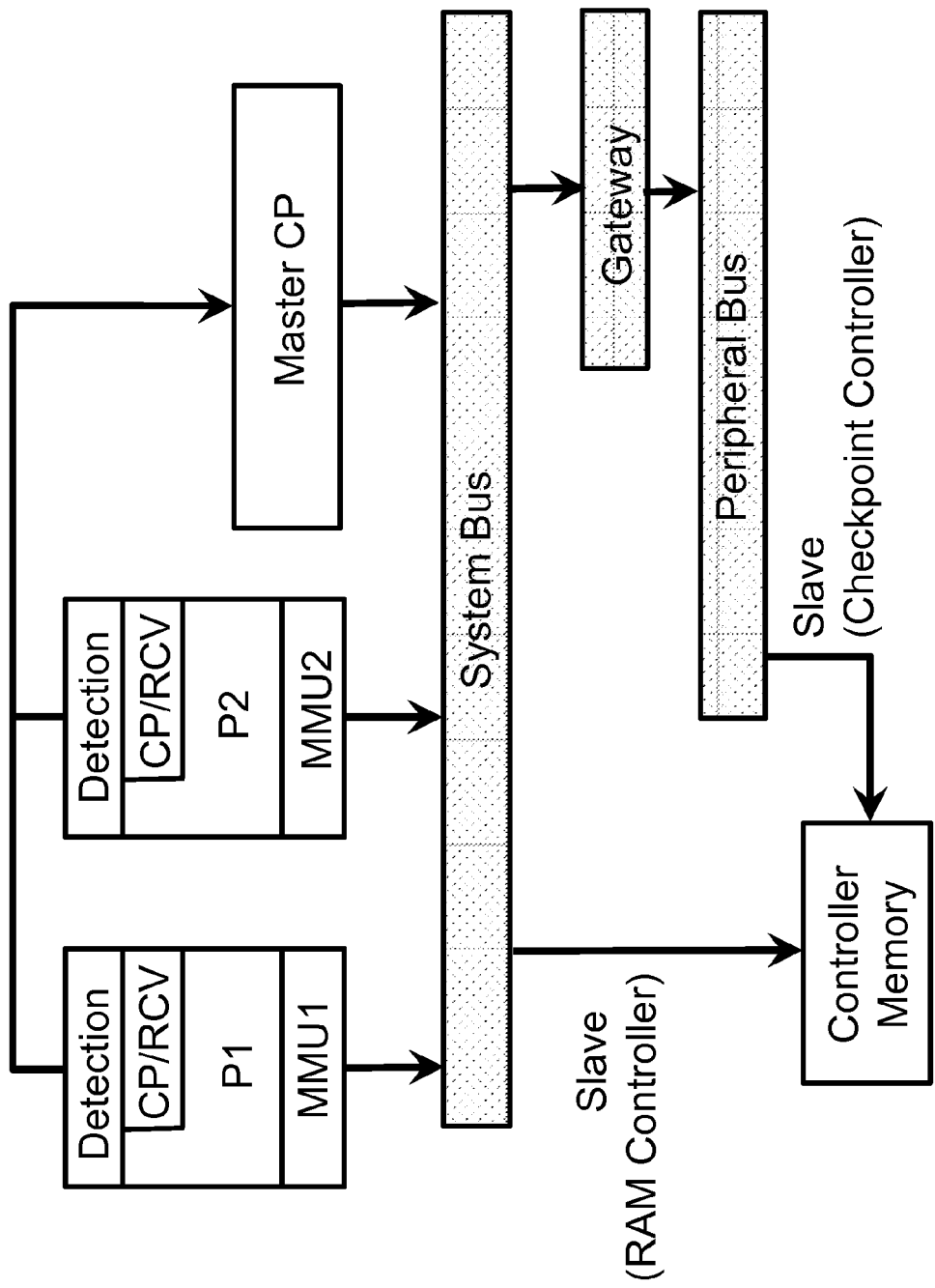
FIG. 2, an architecture diagram illustrating an example of embodiment of a system according to the invention.

FIG. 2 shows an architecture diagram of an example of embodiment of a system according to the invention comprising the processors P1 and P2. Each of the processors P1 and P2 includes an MMU. The processors P1 and P2 are capable of checkpointing, i.e. they are able to save and recover their internal state (registers, pipeline stages, cache memory, MMU state, etc.). To this end, the processors P1 and P2 also include error detectors. The system comprises at least one Memory Controller capable of checkpointing by SDD in the memory MEM, i.e. it is capable of recovering the memory sector corresponding to an SDD, as this sector was at a given checkpoint. The memory MEM is not shown in FIG. 2 for clarity's sake. The system also comprises a Master CP (CP—CheckPoint) component responsible for the coordination of inter-SDD checkpointing. It also comprises a system bus and a peripheral bus connected via a gateway acting as an interconnection system.

Each of the components capable of checkpointing manages a set of checkpoints. For example, the processor P1 can manage a list of records, each record representing the internal state of the processor P1 at an instant when the Master CP component ordered a checkpoint. The processor P2 can handle a similar list. The Memory Controller can itself manage a list of records, each record representing a sector of the memory MEM corresponding to an SDD at an instant when the Master CP component ordered a checkpoint. These lists evolve according to the orders of the Master CP component.

Each of the components capable of checkpointing is also capable, when the Master CP component requests it, of recovering one of the checkpoints from the set of checkpoints that it manages. For example, the processor P1 can restore its internal state as it was at an instant when the Master CP component ordered a checkpoint, thanks to the record of this internal state that it has kept in its list. The processor P2 can do the same. The Memory Controller can itself restore a sector of the memory MEM corresponding to an SDD as it was at an instant when the Master CP component ordered a checkpoint, thanks to the record of this sector that it has kept in its list.

If an error occurs in the processor P1 or P2 while it is executing a process $P_a$ using memory resources $RM_a$, then this error may have different consequences. The memory resources $RM_a$ of the process $P_a$ are the set of ranges that it uses in reading/writing for storing its instructions and its data in the memory MEM. These ranges may optionally be non-contiguous. The error may remain latent, but it may also be propagated by causing the system to gradually diverge from an error-free execution. If the error is propagated, then it may optionally result in a memory write to an address that does not form part of the memory resources $RM_a$. Assuming that an error in the processor $P_i$ during the execution of the process $P_a$ may be propagated anywhere in the memory would require considering all the applications in their entirety, which would tend to greatly increase checkpointing.

Error Confinement

This is why the invention provides an error confinement system advantageously using an MMU or an MPU. In the present example of embodiment of FIG. 2, this involves MMU1 and MMU2 being included in the processors P1 and P2 respectively. An MMU, like an MPU, can be used notably for managing access rights to memory by processes, using services provided by the operating system. Until now, an MMU or an MPU was used to avoid programming errors committed by developers of applications and to guard against malicious attacks. The invention provides for using them to combat transient errors, by denying certain accesses to memory. Thus, error confinement is achieved, which prevents the propagation of errors outside the memory resources of a given process. The invention also provides for matching the confinement area to an SSD as previously defined. Thus, the memory resources of a process are strictly confined to the SSD of the processor that executes said process.

Considering the example of FIG. 1 of allocation of areas A, B, C and D in memory, MMU1 can, for example, manage according to the prior art the individual configuration of access rights for the process for which the Pid is 2, as follows:
A: access denied;
B: Read/Write;
C: Read Write;
D: access denied;
Other areas: access denied.

Similarly, MMU2 can manage according to the prior art the individual configuration of access rights for the process for which the Pid is 3, as follows:
A: access denied;
B: access denied;
C: Read;
D: Read/Write;
Other areas: access denied.

The invention provides for adding to these individual configurations of access rights managed by the MMUs configurations of checkpointing by SDD. Thus, the two processes with Pids of 2 and 3 having been grouped together in the same data dependency sphere 20 in order to form a coordinated checkpoint for these two processes, the individual configurations described above are not called into question, but may advantageously be consulted in order to generate the following checkpointing configuration for the SDD 20:
A: Inactive Checkpointing;
B: Active Checkpointing;
C: Active Checkpointing;
D: Active Checkpointing;
Other areas: Inactive Checkpointing.

In addition, a process may optionally not be assigned to any SDD Such a process is then not protected against transient errors in logic. Nevertheless, its memory access rights must be restricted by appropriate programming of the MPU/MMU components, so that when an error occurs during the execution thereof their access to the confined SDDs is denied. This error confinement system according to the invention reduces the overall complexity of checkpointing.

Checkpointing Coordination

In general, the function of the Master CP component is to coordinate checkpointing between the system components capable of checkpointing, namely the processors P1 and P2 and the Memory Controller. This function notably includes accepting and processing checkpoint creation requests by these components. This function also includes sending orders for new checkpoint creation on an SDD to the components that host the SDD's resources. This function also includes sending orders for restoring a checkpoint on an SDD to the components that host the SDD's resources. The Master CP component comprises several interfaces for ensuring this complex coordination function.

The Master CP component of the present example of embodiment of FIG. 2 may notably comprise a detection interface. This interface is unidirectional and takes as input events produced by the fault or error detectors present in the system. This detection interface may be implemented in various ways, such as by using dedicated threads or by using the system bus or the peripheral bus. But other embodiments are possible.

The Master CP component of the present example of embodiment of FIG. 2 also comprises a coordination interface. This coordination interface is bidirectional and its purpose is to coordinate the various phases of checkpointing between the system components capable of checkpointing, namely the processors P1 and P2 and the memory controller. This interface may be integrated on the system or peripheral bus, but other embodiments are possible.

The various messages exchanged on the coordination interface of the present example of embodiment of FIG. 2 are listed in table 1 below, in which the component capable of checkpointing designates either the processor P1, or the processor P2, or the Memory Controller:

Thus, in the present example of embodiment of FIG. 2, the Master PC component can accept and process a new checkpoint creation request from a resource R thanks to the following sequence:
  Reception of the message "New checkpoint request" sent by the resource R;
  Determination of the SDD to which the resource R belongs, denoted by SDDr;
  Sending a message "checkpoint creation order on SDDr" to each component having SDDr resources, i.e. having at least one resource used by one of the SDDr constituent processes.

If an error is detected, it is reported on the dedicated interface of the Master CP component. When detection occurs in the present example of embodiment of FIG. 2, the following sequence may take place:
  Determination of the SDD or SDDs potentially affected by this error, which requires knowledge of the organization of the memory in SDD sectors;
  For each $SDD_i$ identified:
  Determination of the checkpoint to be restored according to the error;
  Sending of the message "order for restoring checkpoint j on $SDD_i$" to the components of $SDD_i$;
  Waiting for the reception of messages "Restoration of $SDD_i$ checkpoint j performed" sent by the components;
  Sending message "Order for relaunching $SDD_i$" to the components belonging to this $SDD_i$.

According to the features of the detection methods and the frequency of creating new checkpoints, some old checkpoints can be safely erased, since there may be more recent and equally reliable checkpoints. Thus, in order to recover the storage space for future checkpoints, the Master CP component of the present example of embodiment of FIG. 2 may determine the obsolescence of checkpoints and request their deletion by the components, thanks to the following sequence:
  Determining that checkpoint j of $SDD_i$ is obsolete;
  Sending message "Order for deleting checkpoint j of $SDD_i$" to the components of $SDD_i$.

Since the coding of checkpoint numbers is performed over a limited number of bits, if the system comes to evolve for long enough, it may be that the maximum value of checkpoint number is reached. From this moment, subsequent checkpoints must be renumbered from zero. But the reuse of lower numbers is only possible if the floor value for checkpoint numbers has been raised, i.e. only if it has been declared that the checkpoint numbers below a certain value are obsolete. This floor value, denoted by Val_plancher in the present example of embodiment of FIG. 2, is defined by the Master CP component. Thus, in the present example of embodiment of FIG. 2, the Master CP component may perform a grouped obsolescence operation on all the checkpoints below a given number for a given SDD, thanks to the following sequence:
  Determining that all the checkpoints less than or equal to checkpoint j of $SDD_i$ are obsolete;
  Sending a message "Order for deleting all the checkpoints below Val_plancher for $SDD_i$" to the components of $SDD_i$.

A checkpoint creation initiating function may also prove useful for certain applications, the idea being to create checkpoints on SDDs without this being the result of a request message from a component. For example, an application that occupies an SDD may define the instants of checkpointing periodically. This could be relevant if the application has no input-output, like a very independent application, which may make the taking of checkpoints optional. Thus, in the present example of embodiment of FIG. 2, the Master CP component may perform the following sequence:
  Determining the instant of checkpointing on an $SDD_i$;
  Sending a message "checkpoint creation order on SDDr" for each component having SDDr resources.

Memory Control

Figure 3:
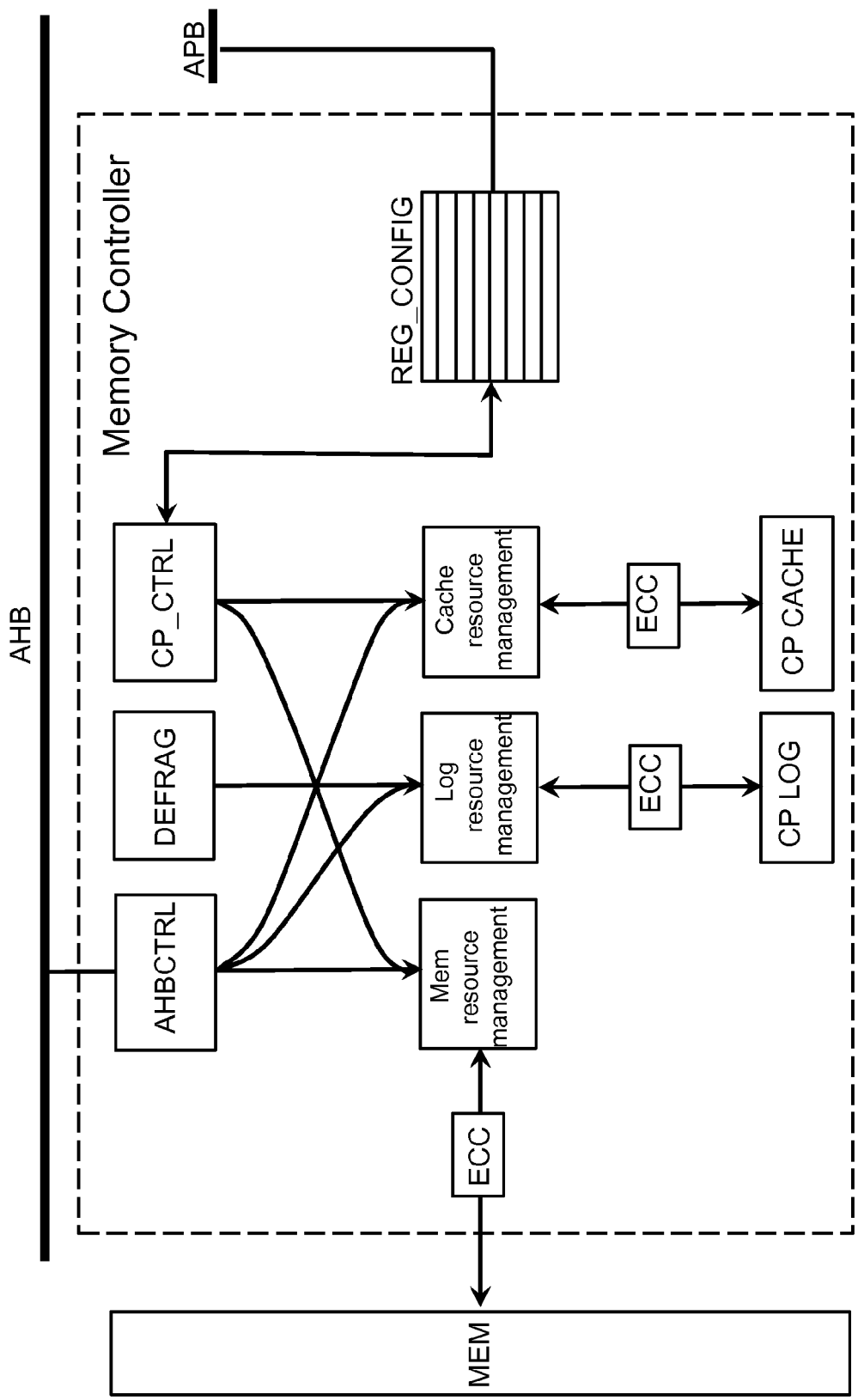
FIG. 3, an architecture diagram illustrating an example of an embodiment of a memory controller according to the invention capable of checkpointing by data dependency sphere.

FIG. 3 is a diagram illustrating the architecture of the memory controller in the example of embodiment of FIG. 2, this controller being capable of checkpointing by SDD according to the invention. The memory controller of the present example of embodiment notably comprises a management module of the memory MEM, a management module of a CP Log component and a management module of a CP Cache structure. The memory controller also comprises a system bus controller AHBCTRL (AHB—Advanced High-performance Bus), a defragmentation module DEFRAG and a checkpoint control module CP_CTRL. The roles of these various modules will be described later. Indeed, the memory controller of the present example of embodiment comprises a first interface AHB with the system bus. It also comprises a second interface with the memory MEM containing the current data. It also includes a third interface APB with the peripheral bus (Advanced Peripheral Bus) for the configuration and control of the memory controller. It is notably via this interface APB that the checkpointing protocol is implemented with the Master CP component. In order to perform checkpointing by SDD, the present example of embodiment of memory controller is notably capable of the following operations:

Reading a word in the memory MEM;
Writing a word in the memory MEM;
Creating a checkpoint on an SDD;
Deleting a checkpoint on an SDD, this action being performed when said checkpoint may be considered obsolete;
Deleting one or more checkpoints simultaneously, by changing the floor value of the checkpoints of a given SDD, also when the checkpoints concerned may be considered obsolete;
Recovery of an SDD checkpoint.

The present example of embodiment of memory controller also comprises the CP (CP—CheckPoint) Log component, which stores the information needed for restoring the memory MEM as it was at the moment of any checkpoint taken on any SDD, except for the checkpoints that have been declared obsolete. Obsolete checkpoints are indeed intended to be deleted from the CP Log component.

Figure 4:
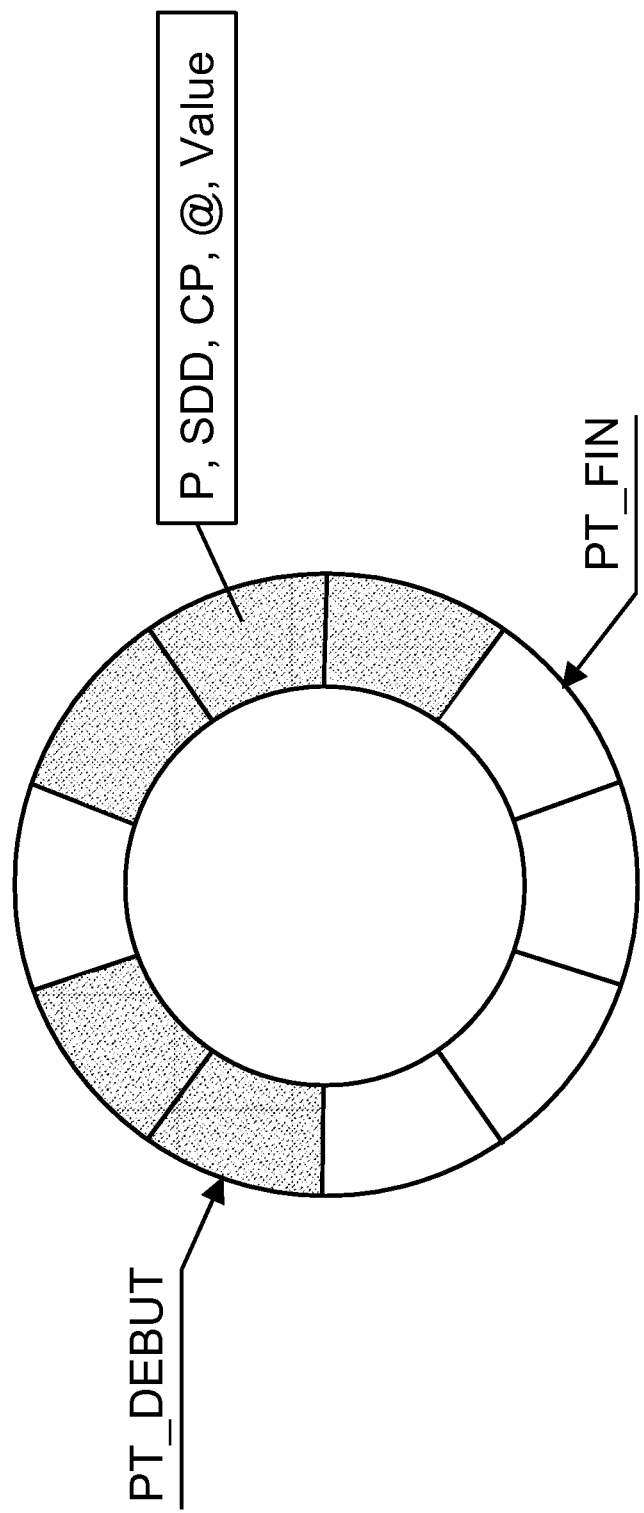
FIG. 4, a schematic illustration of an example of a saving component according to the invention.

FIG. 4 schematically illustrates the CP Log component of the present example of embodiment. It notably comprises a memory consisting of several fields per line managed as a circular buffer with the aid of two registers PT_DEBUT and PT_FIN, which are pointers respectively to the beginning and the end of the effective data area. The size of the circular buffer is a generic parameter of the CP Log component and can be adapted for correctly dimensioning the checkpointing system. A field P determines the presence of a datum in the line considered, the value 0 indicating the absence and the value 1 indicating the presence of a datum. A field SDD indicates the identifier of the SDD. A field CP stores the identifier of the checkpoint on the SDD indicated by the previous field. A field @ stores the address of the word. A field Value stores the value as it was at the address @ at the instant when the checkpoint was taken, on the corresponding SDD.

Figure 5:
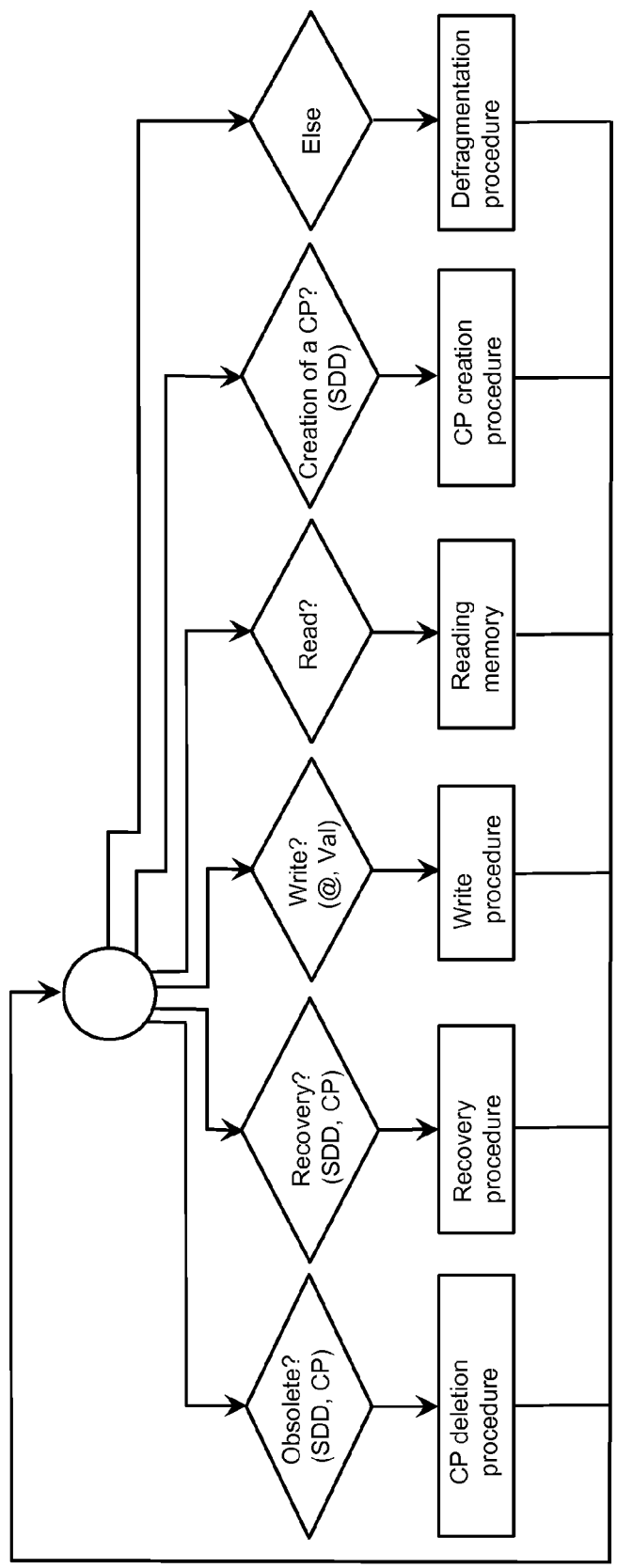
FIG. 5, a state machine illustrating an example of a memory controller according to the invention.
Figure 7:
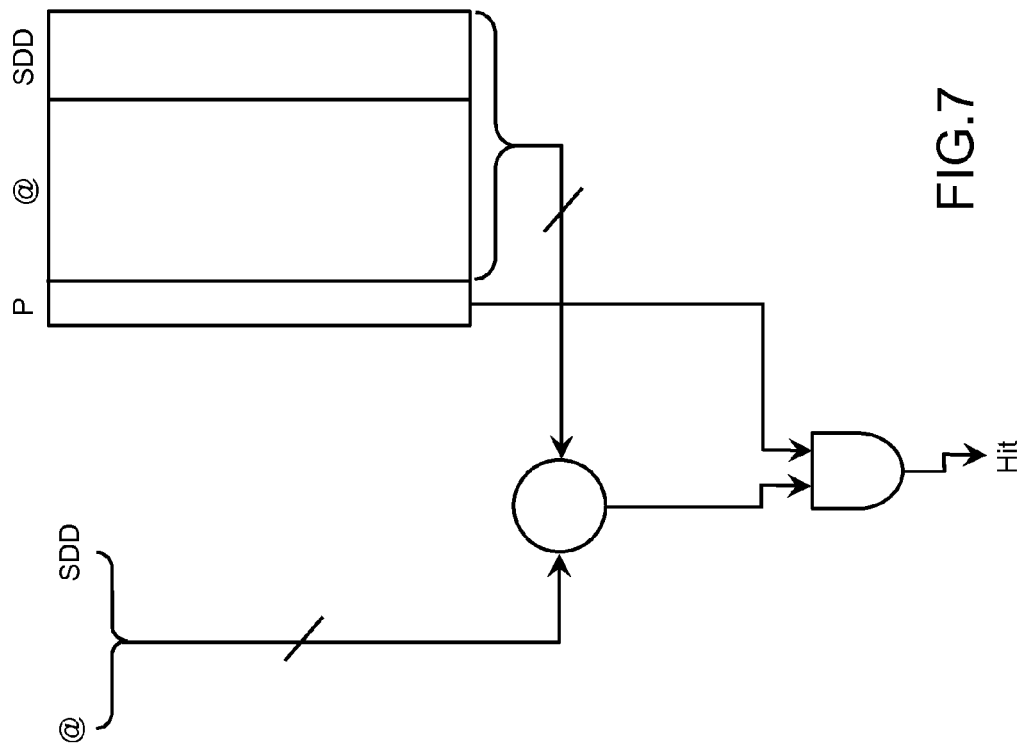
FIGS. 6, 7 and 8, diagrams illustrating an example of a write procedure according to the invention.
Figure 6:
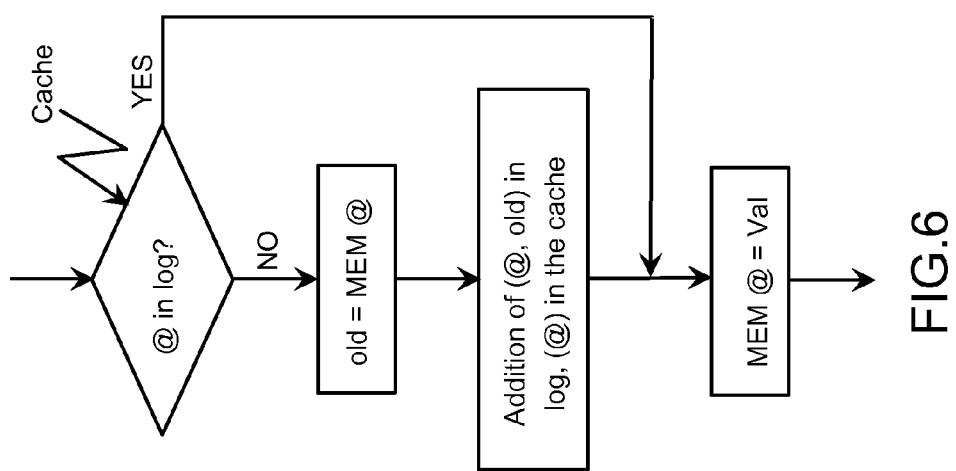
Figure 9:
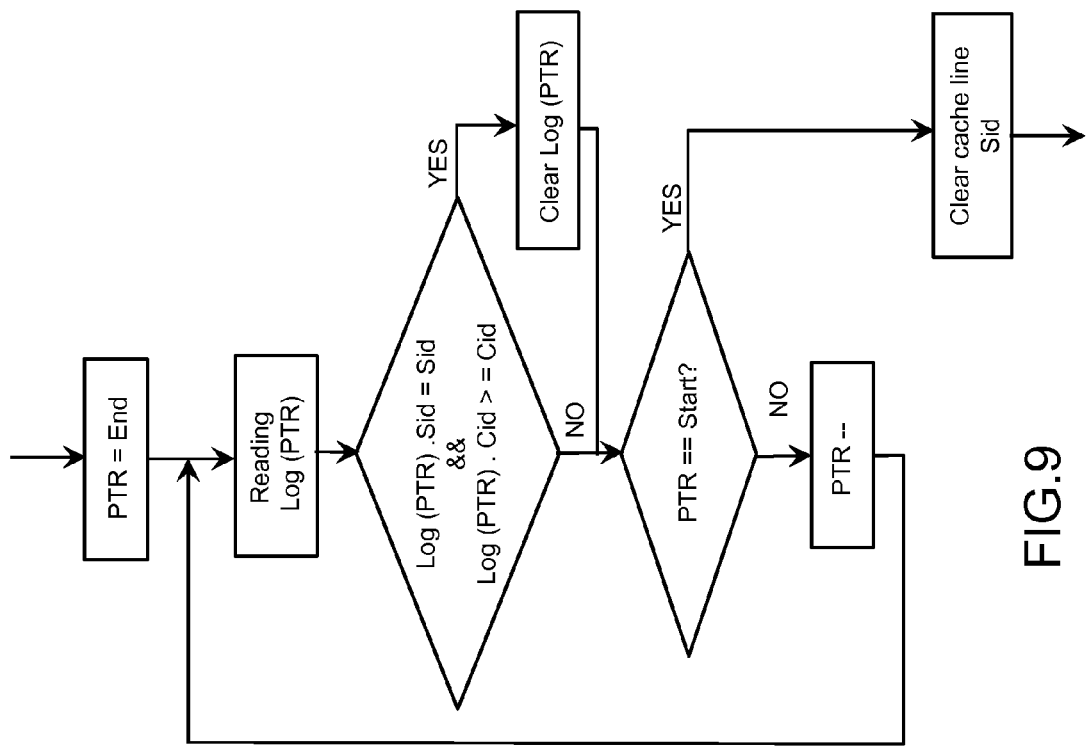
FIGS. 9 and 10, diagrams illustrating an example of a recovery procedure according to the invention.
Figure 8:
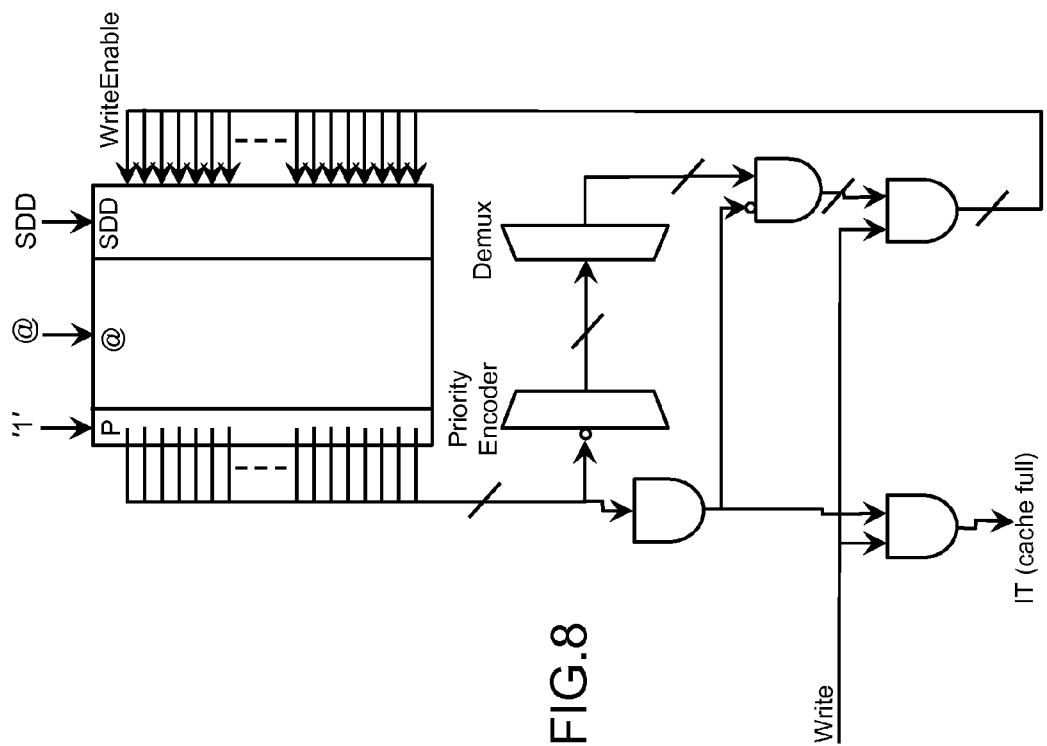
Figure 11:
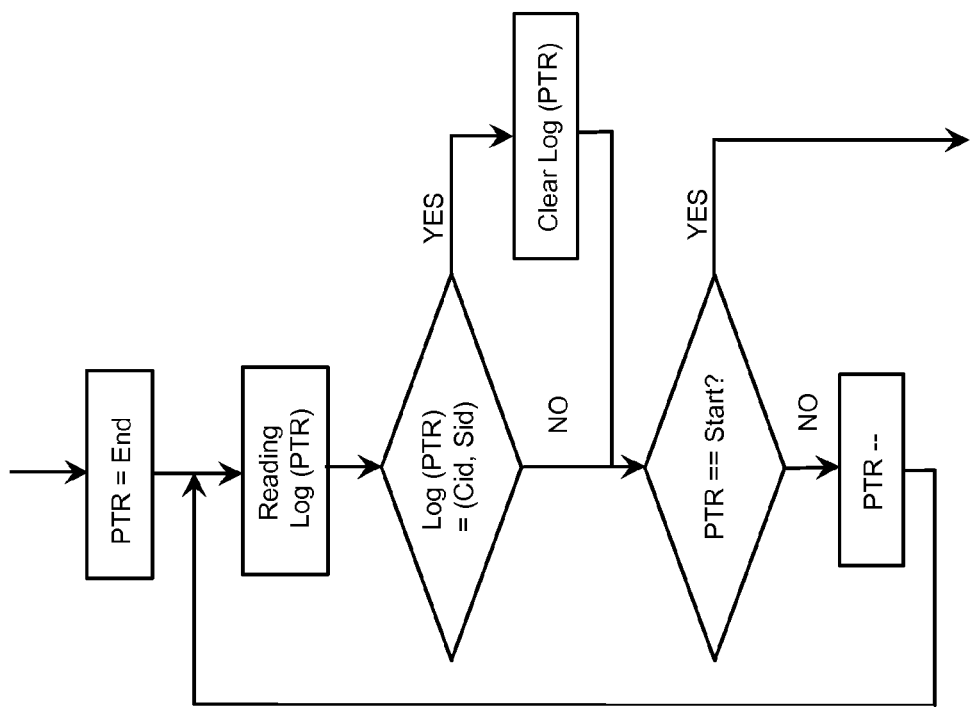
FIG. 11, a diagram illustrating an example of a procedure for deleting an obsolete checkpoint according to the invention.
Figure 10:
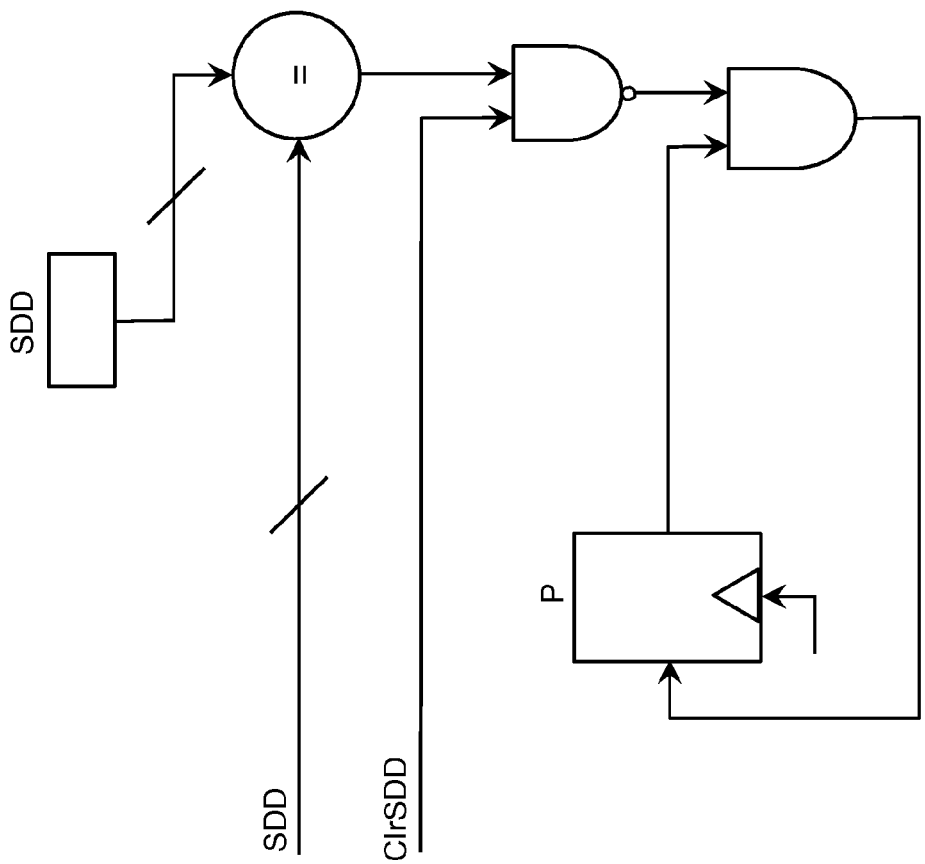
Figure 12:
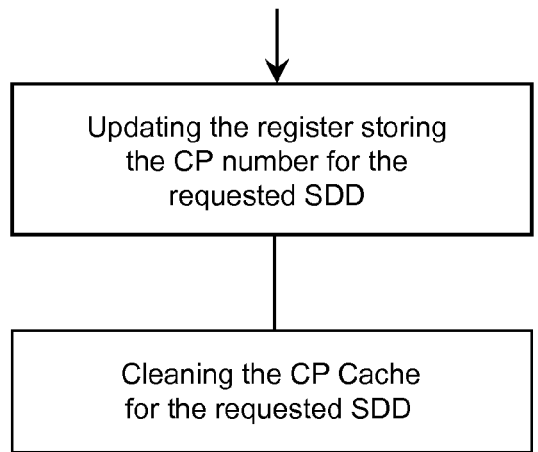
FIG. 12, an illustration of an example of a procedure for creating a checkpoint according to the invention.
Figure 13:
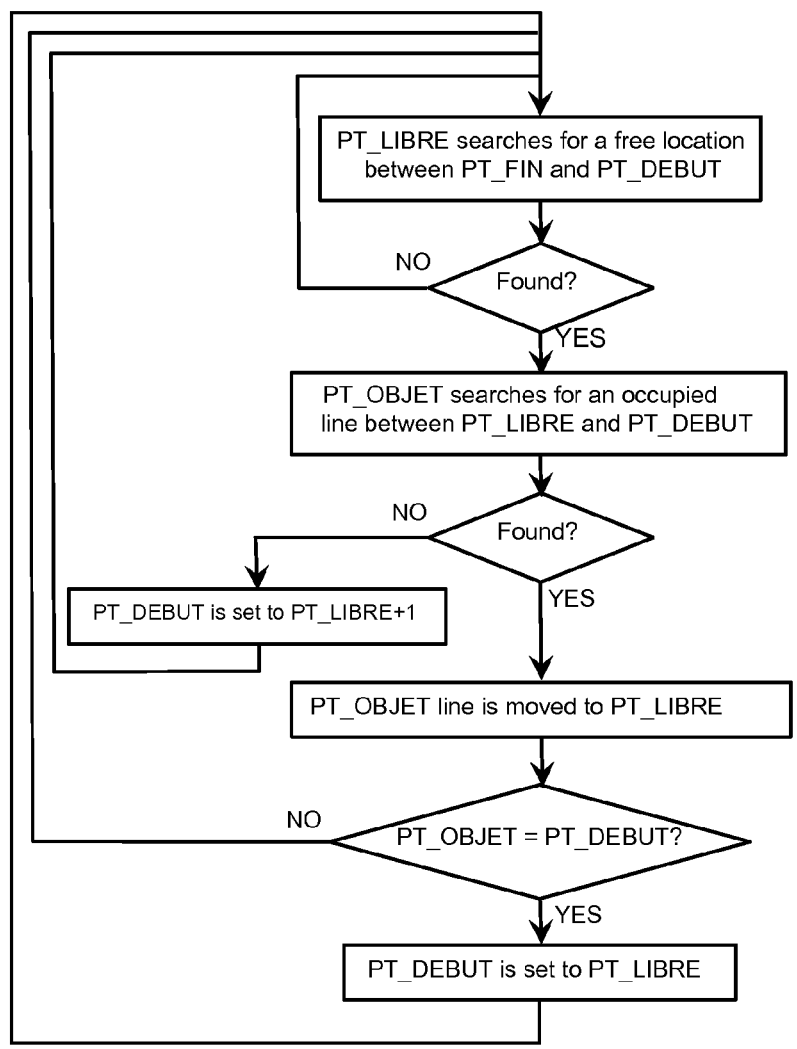
FIG. 13, an illustration of an example of a maintenance procedure according to the invention.

FIG. 5 shows an example of a global state machine of the memory controller, notably the write procedure which will be shown in detail in FIGS. 6, 7 and 8, the recovery procedure which will be shown in detail in FIGS. 9 and 10, the procedure for deleting an obsolescent checkpoint which will be shown in detail in FIG. 11, the procedure for creating a checkpoint which will be shown in detail in FIG. 12, the maintenance procedure which will be shown in detail in FIG. 13 and finally the read procedure.

Memory Control: Writing

FIG. 6 is a diagram illustrating a write operation to the main memory MEM, such an operation being able to be performed directly or requiring to be previously saved in the circular buffer of the CP Log component, which generates an additional latency. Indeed, only the first write to a given address, on a given checkpoint of a given SDD is recorded. Subsequent writes are then not recorded until the creation of a new checkpoint on the SDD concerned. New writes are stored in the location pointed to by PT_FIN, this pointer being incremented at the end of the operation. It should be noted that the area between PT_DEBUT and PT_FIN is kept in order by SDD. This property is always true, even during defragmentation operations which are described later in the present application. If the circular buffer is full, i.e. if PT_FIN equals PT_DEBUT, then writing to the buffer is blocked, just like the write operation to the memory MEM. An indicator is then set for the Master CP component. The initial phase of this write is particularly sensitive since it is necessary to determine the presence of an equivalent previous write inside the buffer. A simple way to make this check would be to scan through the buffer in the opposite direction from PT_FIN buffer until encountering lines with the field P equal to 1, the SDD field containing the identifier of the corresponding SDD and the field CP containing the identifier of the previous checkpoint. The search would stop there because the buffer is in order. But this is not the approach used in the present example of embodiment, as the worst case of write latency would then be extremely high. Preferably, for determining the presence of an equivalent previous write inside the buffer in the present example of embodiment, the CP Cache dedicated structure is used, as shown in FIG. 3. This CP Cache structure consists of a memory portion and a combinatorial portion.

FIG. 7 is a diagram illustrating the combinatorial part of the CP Cache structure implementing the logic for determining the presence of an equivalent previous write inside the circular buffer of the CP Log component. The memory part of the CP Cache component, which will be simply called the "cache" hereafter, consists of a certain number of lines, which number must be correctly dimensioned. If this number of lines is too low, then the cache is often full and checkpoints must often be created needlessly. This affects the performance of the system on several levels. Conversely, if the number of lines is too high, then the cost in surface is problematic, both regarding memory storage elements and combinational logic. Each of the lines is subdivided into several fields. A field P indicates the presence of an information line, the value 0 indicating absence and the value 1 indicating presence. A field @ stores an address already accessed from the latest checkpoint creation on the SDD considered. A field SDD stores the identifier of the SDD considered. The combinatorial part can be used to perform actions in a cycle on the interpretation of the contents of the memory part, as well as on its updating. Thus, if the output Hit of the CP Cache component is 1, then an equivalent write has already been performed at this address, on this checkpoint and on this SDD. If the output Hit of the CP Cache component is 0, then this is the first write. Where applicable, the CP Log component buffer is completed as previously described and this operation is associated in parallel with a write operation to the cache.

FIG. 8 uses a diagram to illustrate how it is written in parallel in the CP Log component buffer and in the CP Cache component cache. The logic described in FIG. 8 adds the fields @ and SDD of the write operation in the first free line of the cache, i.e. such that P=0, while setting the value of P to 1. If the cache is full, then an indicator is set for the Master CP.

Memory Control: Recovery

FIG. 9 schematically illustrates control of the recovery operation. As already mentioned previously, the circular buffer is kept in order by SDD. When a recovery of an SDD checkpoint is requested, the circular buffer of the CP Log component is scanned through in the reverse direction, i.e. from the pointer PT_FIN to the pointer PT_DEBUT. For each line, if the field P is 1, if the field SDD contains the identifier of the corresponding SDD and if the field CP contains an identifier greater than or equal to the identifier of the checkpoint to be restored, then the Value field of the line is copied to the address indicated by the field @ and the field P is reset to 0.

FIG. 10 schematically illustrates the SDD cleaning operation of which the CP Cache component is capable. For this, the CP Cache component uses the specific logic, which, in one cycle writes 0 in field P of all the lines of the cache for which the value of the field SDD corresponds to the action of recovery. This disables the lines which may be reused in the future for storing other write actions in memory. In addition, the current checkpoint of the SDD which has been recovered is configured to the recovered checkpoint.

As already explained previously, the current checkpoint number of an SDD is a whole number that increases over time during system operation. However, a hardware counter inevitably ends up reaching saturation, due to the limited number of bits for its encoding. For overcoming this problem, the invention provides for introducing the concept of a floor value into the system. When a recovery takes place, the relative age of the analyzed checkpoint must be compared to the age of the checkpoint given as parameter. For each SDD, a floor value termed Val_plancher is maintained, which can be used for comparing checkpoints even in the event of saturation. Thus, instead of making a direct comparison test on the values, such as evaluating the logical value of $(CP_i<CP_{param})$, an indirect comparison test is performed by evaluating the logical value of $((CP_i-Val\_plancher) \mod CP_{max}<(CP_{param}-Val\_plancher) \mod CP_{max})$.

Memory Control: Deleting a Checkpoint

FIG. 11 schematically illustrates control of the obsolescence operation. When an SDD checkpoint is declared obsolete, the stored elements containing the corresponding checkpoint number on the corresponding SDD are deleted from the circular buffer by writing the value 0 in the field P. A first possibility is to make a particular checkpoint obsolete. A second possibility is to make all checkpoints obsolete which are older than a checkpoint passed as a parameter.

For each SDD, the floor value is updated during the obsolescence operation of all the checkpoints older than the checkpoint passed as a parameter. The floor value is then redefined and takes the value of the parameter supplied. This technique enables the system to operate over an unbounded time.

Memory Control: Creating a Checkpoint

FIG. 12 schematically illustrates control of the operation for creating a new checkpoint on an SDD. The register indicating the current checkpoint for the identified SDD is updated incrementally. In addition, the SDD cleaning operation is activated on the corresponding SDD, as the next writes in this SDD must be considered as new writes since the last checkpoint.

Memory Control: Defragmentation

FIG. 13 schematically illustrates control of the operation of defragmenting the circular buffer of the CP Log component. Indeed, when checkpoint deletion operations take place, due to obsolescence or recoveries, blank lines appear between PT_DEBUT and PT_FIN, i.e. lines such that P=0. These lines are not usable and constitute wasted space. In order to avoid this, the controller must, whenever possible, perform a defragmentation of the circular buffer of the CP Log component. The controller manages two additional pointers on the circular buffer: PT_LIBRE and PT_OBJET.

The algorithm is initialized by setting PT_LIBRE on the first empty line from PT_FIN. The algorithm is then a search loop where at each step of the loop, the first occupied line starting from PT_LIBRE is moved over it, and the pointer PT_LIBRE progresses until it finds the next free location. The pointer PT_FIN of the start of the buffer is updated when the lines between PT_LIBRE and PT_DEBUT are free.

Memory Control: Reading

The read operation consists quite simply of reading in the main memory MEM. Checkpoint capacity according to the invention does not affect performance in terms of reading.

An additional advantage of the present invention is to be compatible with fault detectors with high detection latencies, placed outside the critical path, which enables high performance.

The invention claimed is:

1. A method for enhancing the reliability of a system comprising a plurality of processors and a memory, each processor having access to a specific access area of the memory, the method comprising:
grouping processes into a plurality of groups, each group being a data dependency sphere grouping processes according to their access areas of the memory, wherein a data dependency sphere comprises areas of the memory which satisfy the following properties:
a union of the access areas belonging to the same data dependency sphere being logically connected, and
the intersection between access areas belonging to the same data dependency sphere being not empty;
saving, individually for each group of processes, data stored in the memory, the data being used by at least one of the processes belonging to said group, to restore an error-free global state of the system following an error occurring in one of the processors executing one of the processes belonging to said group, without restoring the entire memory, and
defining a confinement sector for each of the data dependency spheres, by:
denying, to a process, access beyond the memory sector of its data dependency sphere to prevent propagation of a logic error occurring in the processor executing said process; and
managing indicators of memory access areas belonging to each data dependency sphere.

2. A device for enhancing the reliability of a system comprising a plurality of processors and a memory, each processor having access to a specific access area of the memory, the device comprising:
services, supplied by an operating system, configured to group processes into a plurality of groups, each group being a data dependency sphere grouping processes according to their access areas of the memory, wherein a data dependency sphere comprises areas of the memory which satisfy the following properties:
a union of the access areas belonging to the same data dependency sphere being logically connected, and
the intersection between access areas belonging to the same data dependency sphere being not empty;
at least one checkpointing component configured to save, individually for each group of processes, data stored in the memory, the data being used by at least one of the processes belonging to said group, to restore an error-free global state of the system following an error occurring in one of the processors executing one of the processes belonging to said group, without restoring the entire memory, and
a memory unit associated with each of the processors configured to access to the memory by data dependency sphere, the memory unit defining a confinement sector for each of the data dependency spheres and being configured to:

means for deny, to a process, access beyond the memory sector of its data dependency sphere to prevent propagation of a logic error occurring in the processor executing said process; and manage indicators of memory access areas belonging to each data dependency sphere.

3. The device as claimed in claim 2, wherein, for each data dependency sphere, the saved data comprise:

data stored in a connected union of the memory access areas that can be accessed by one of the processes belonging to said sphere, data stored in registers of the processors executing one of the processes belonging to said sphere, data stored in pipeline stages of the processors executing one of the processes belonging to said sphere, data stored in memory management units or in memory protection units (MPU) included in the processors executing one of the processes belonging to said sphere, or data stored in cache memories of the processors executing one of the processes belonging to said sphere.

4. The device as claimed in claim 2, wherein the services for grouping the processes into data dependency spheres supply the data dependency spheres corresponding to all currently executed processes.

5. The device as claimed in claim 4, wherein the at least one checkpointing component comprises a checkpointing component configured to coordinate saving of the data dependency spheres corresponding to all currently executed processes, the checkpointing component being configured to:

initiate a data save for a data dependency sphere corresponding to currently executed processes; and initiate, following the logic error that has occurred in one of the processors executing one of the processes belonging to said sphere, restoration of the data saved for said data dependency sphere exclusively.

6. The device as claimed in claim 2, wherein the memory unit confining access to the memory sector includes a memory management unit or a memory protection unit associated with each of the processors of the system, said memory management unit or memory protection unit denying, to the processor with which it is associated, access to the memory unit outside of the area allocated to the process being executed by said processor.

7. The device as claimed in claim 6, wherein the memory management unit or the memory protection unit is configured to manage memory access rights, the current data dependency spheres being dependent on the memory access rights.

* * * * *

UNITED STATES PATENT AND TRADEMARK OFFICE
CERTIFICATE OF CORRECTION

PATENT NO. : 9,135,110 B2  
APPLICATION NO. : 13/991128  
DATED : September 15, 2015  
INVENTOR(S) : Mickael Cartron et al.

Page 1 of 1

It is certified that error appears in the above-identified patent and that said Letters Patent is hereby corrected as shown below:

In the claims:

Column 15 Line 4 please replace "means for deny, to a process" with --deny, to a process--.

Signed and Sealed this
Twenty-sixth Day of January, 2016

Michelle K. Lee
*Director of the United States Patent and Trademark Office*